US012488085B2

(12) United States Patent
Sugai

(10) Patent No.: US 12,488,085 B2
(45) Date of Patent: Dec. 2, 2025

(54) ACCOUNT MANAGEMENT SYSTEM, ACCOUNT MANAGEMENT METHOD, INFORMATION TERMINAL AND MEDIUM

(71) Applicant: CANON KABUSHIKI KAISHA, Tokyo (JP)

(72) Inventor: Yousuke Sugai, Kanagawa (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 106 days.

(21) Appl. No.: 18/522,446

(22) Filed: Nov. 29, 2023

(65) Prior Publication Data

US 2024/0211580 A1 Jun. 27, 2024

(30) Foreign Application Priority Data

Dec. 23, 2022 (JP) ................................ 2022-207241

(51) Int. Cl.
*G06F 21/44* (2013.01)
(52) U.S. Cl.
CPC .................................... *G06F 21/44* (2013.01)
(58) Field of Classification Search
None
See application file for complete search history.

(56) References Cited

U.S. PATENT DOCUMENTS

| 11,818,226 B2 | 11/2023 | Kawahata | |
|---|---|---|---|
| 2013/0044373 A1* | 2/2013 | Kaida | G02B 5/3058 359/485.05 |
| 2016/0366192 A1* | 12/2016 | Anderson | H04L 65/1069 |
| 2017/0289275 A1* | 10/2017 | Saito | H04W 12/068 |
| 2018/0351739 A1* | 12/2018 | Ota | G06V 40/70 |
| 2021/0385527 A1* | 12/2021 | Graham | H04N 21/472 |
| 2022/0277367 A1* | 9/2022 | Takeichi | G06Q 10/083 |
| 2023/0247025 A1* | 8/2023 | Nakayama | H04L 63/102 726/4 |
| 2024/0045624 A1* | 2/2024 | Saito | G06F 3/1222 |

FOREIGN PATENT DOCUMENTS

| JP | 2021005251 A | | 1/2021 | |
|---|---|---|---|---|
| JP | 2023111773 A | * | 8/2023 | ......... H04L 63/0807 |
| JP | 2024021839 A | * | 2/2024 | ........... G06F 16/245 |

* cited by examiner

*Primary Examiner* — Joshua Joo
(74) *Attorney, Agent, or Firm* — ROSSI, KIMMS & McDOWELL LLP

(57) ABSTRACT

An account management system is provided. The system comprises an information terminal; a peripheral device; an account management server; and a peripheral device management server. The information terminal transmits a request a first token from the peripheral device management server and receives the first token. The information terminal transmits an account registration request for the peripheral device, together with the first token, to the account management server. The account management server obtains the peripheral device management information of the peripheral device from the peripheral device management server using the first token, registers an account of the peripheral device, and transmits authentication information of that account to the information terminal. The information terminal stores the received authentication information.

12 Claims, 13 Drawing Sheets

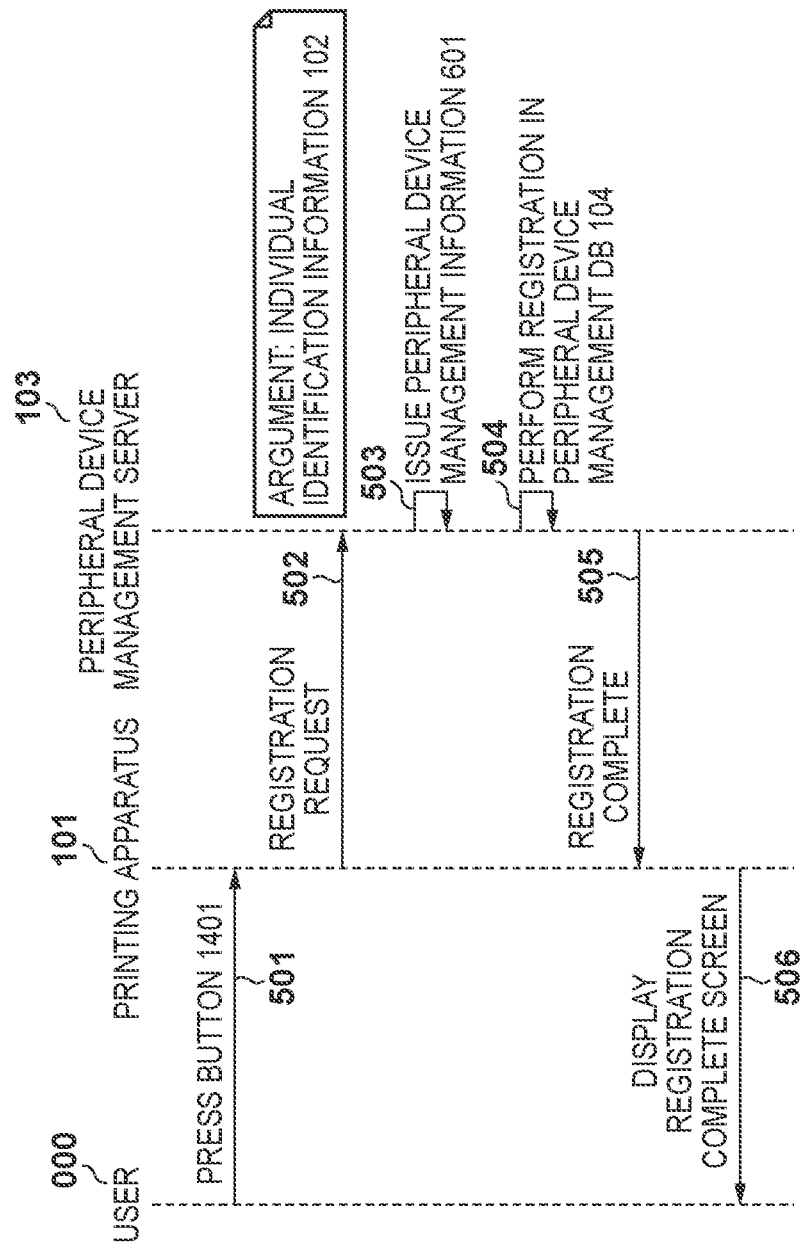

F I G. 6

| PERIPHERAL DEVICE MANAGEMENT INFORMATION | INDIVIDUAL IDENTIFICATION INFORMATION | | INDIVIDUAL BASIC INFORMATION | |
|---|---|---|---|---|
| | MAC ADDRESS | SERIAL NUMBER | PRODUCT NAME | HELD FUNCTIONS |
| PID001 | ABCDEFG | PPPP00001 | PIXUZ-100 | Print |
| PID002 | HIJKLMN | PPPP00100 | PIXUZ-200 | Print,Scan |
| PID003 | OPQRSTU | PPPP00999 | PIXUZ-300 | Print,Scan,Fax |

601 / 102 / 602

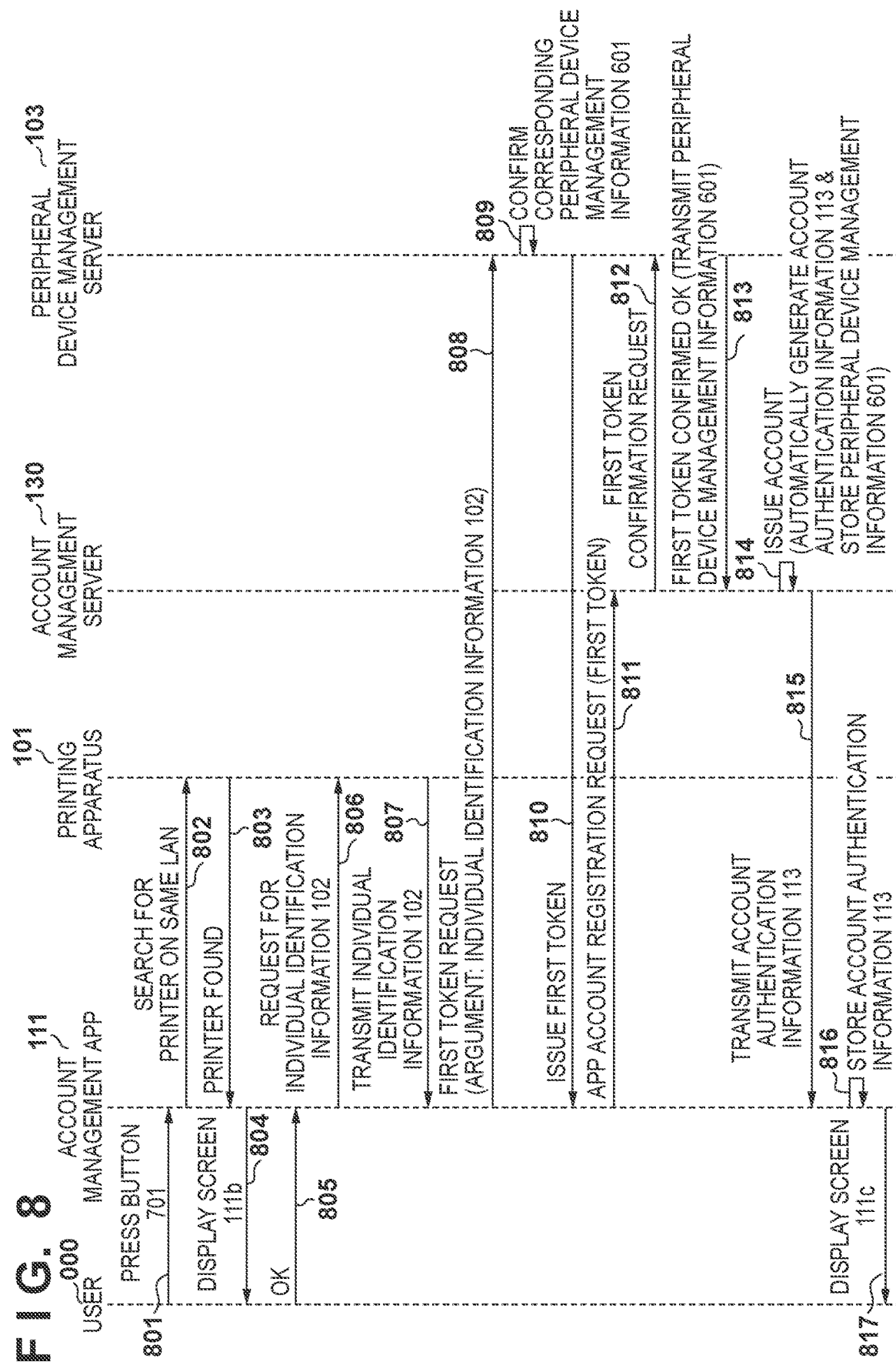

FIG. 9

| ACCOUNT ID | ACCOUNT AUTHENTICATION INFORMATION 113 | | OWNED PERIPHERAL DEVICE INFORMATION 601 |
|---|---|---|---|
| 901 | AUTHENTICATION ID 902 | PASSWORD 903 | PERIPHERAL DEVICE MANAGEMENT INFORMATION 904 |
| AID001 | LID0020 | jfdsapffdsa | PID001 |
| AID002 | LID0021 | 3jf0fsafdbe | PID002 |
| AID003 | LID0022 | djfajlifjda | PID003 |

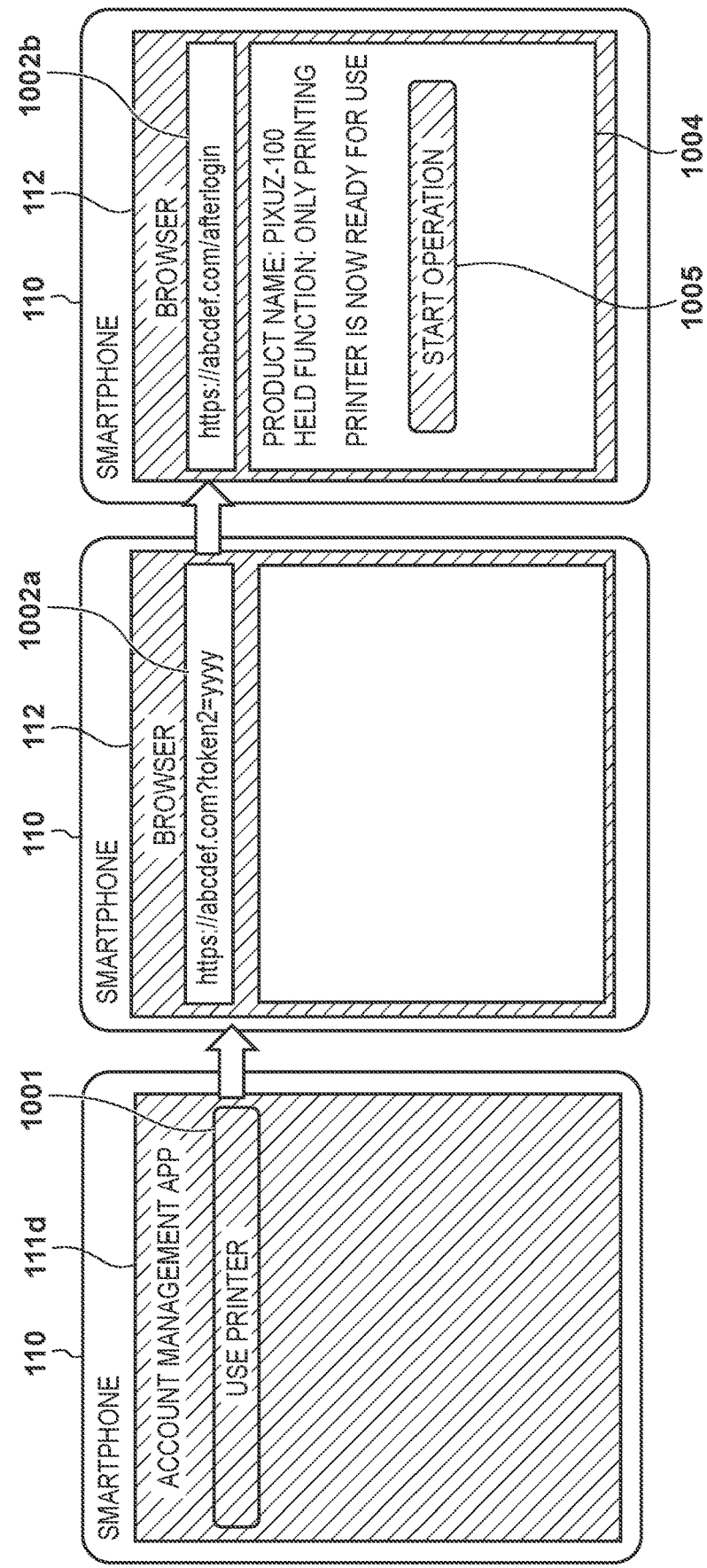

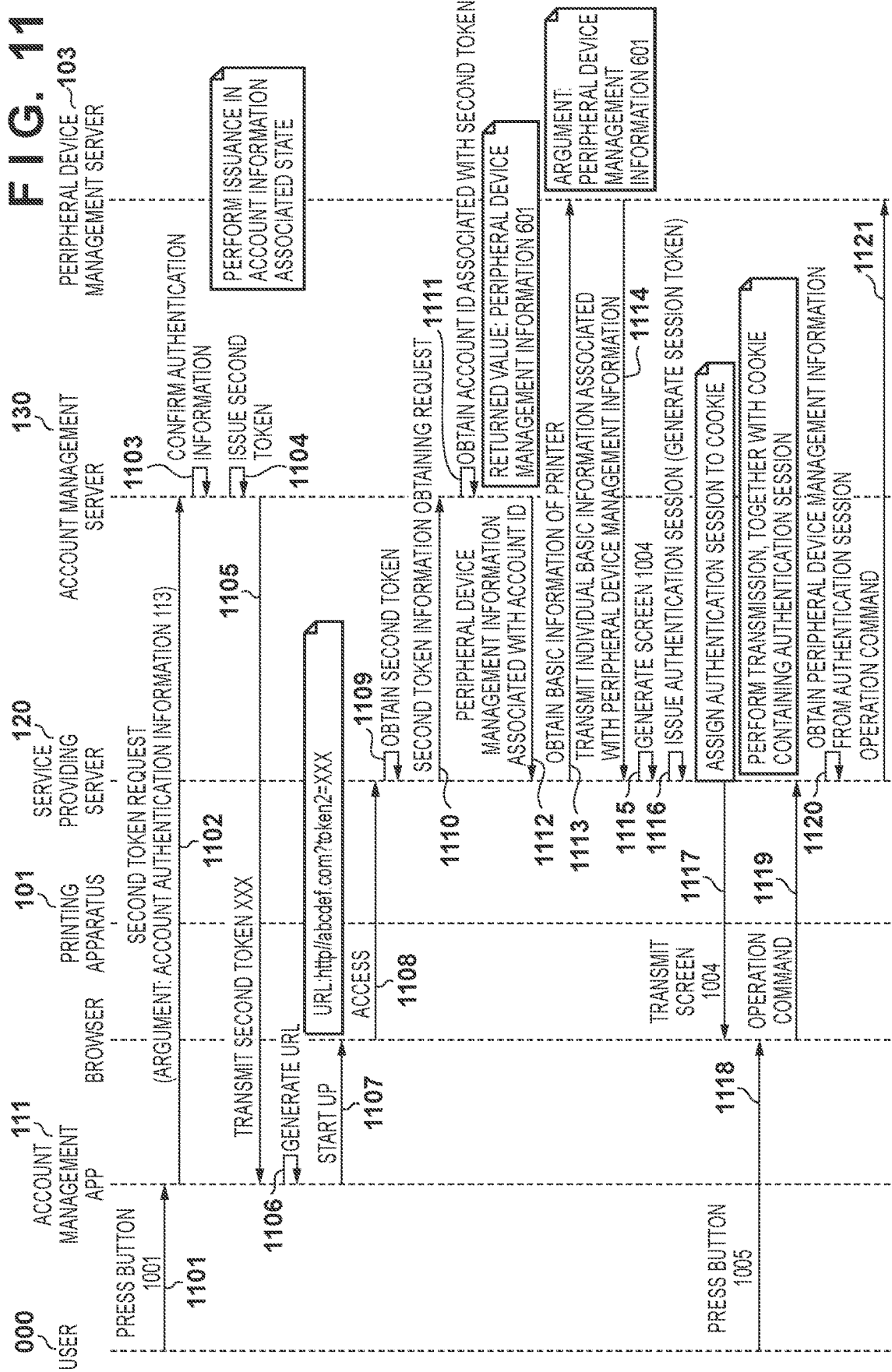

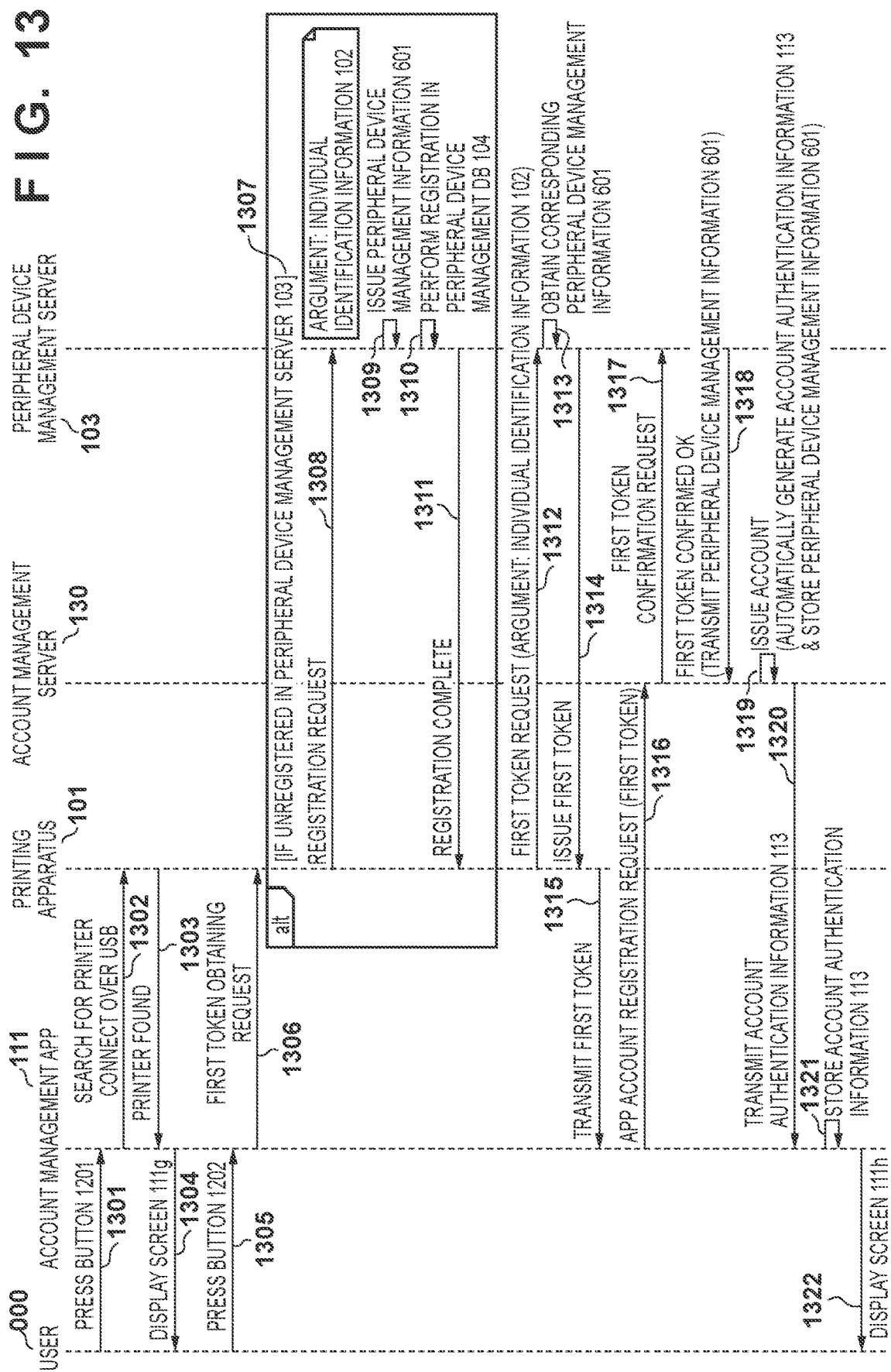

ACCOUNT MANAGEMENT SYSTEM, ACCOUNT MANAGEMENT METHOD, INFORMATION TERMINAL AND MEDIUM

BACKGROUND OF THE INVENTION

Field of the Invention

The present invention relates to a technique for performing authentication for when using a peripheral device via the Internet.

Description of the Related Art

These days, the Internet is widespread, and various things have become connected to the Internet. Nowadays, systems in which a peripheral device can connect directly to the Internet, and by operation of the peripheral device, connections can be established with servers on the Internet and data can be exchanged have become common. For example, Japanese Patent Laid-Open No. 2021-5251 discloses a technique in which a printing apparatus registers unique, self-identifying information, such as a MAC address, in a management server and further performs registration for receiving services from servers and the like that provide various types of services.

Meanwhile, information devices that can be carried around and used, such as smartphones, are widespread. Accordingly, systems that allow users to issue commands, away from home, to peripheral devices, such as a printing apparatus at home, and thereby perform printing and the like are also becoming widespread. In such systems, a peripheral device management server for managing peripheral devices, such as a printing apparatus, is provided on the Internet, and the peripheral device management server receives print commands via the Internet, thereby enabling the printing apparatus to execute the print commands.

In such systems that can be accessed by unidentified users, it is common to authenticate users and then make system resources available to authenticated users. One example of the most common authentication methods is a method in which an authentication server performs authentication by having a user enter authentication information, such as an ID or email address and a password. Oftentimes, cumbersome procedures are taken to achieve a state in which authentication can actually be performed. For example, e-mail addresses are commonly used for identity verification; however, in such cases, procedures, such as exchanging an e-mail with an authentication server to confirm that a user is indeed an owner of the registered e-mail address and registering a password, become necessary. Such procedures are necessary in addition to personal computer (PC) account registration, which is necessary even in an environment where a peripheral device and a PC are connected by a USB cable or LAN.

Meanwhile, local applications, such as those installed and used in information devices, that connect to the Internet and thereby provide various services have increased in numbers. In such cases, techniques for eliminating the time and effort of registration as mentioned above are known. For example, in Japanese Patent Laid-Open No. 2021-5251, a technique for issuing an account, a password, and the like for an information terminal using an ID specific to the information terminal, such as a MAC address, is known.

However, an account, such as that mentioned above, is merely an account for identifying an information device or a user that owns the information device, and it does not serve as a means for certifying ownership of a peripheral device.

SUMMARY OF THE INVENTION

The present invention provides an authentication system that allows the use of network resources without undergoing special procedures.

The present invention has the following configurations. That is, according to one aspect of the present invention, there is provided an account management system comprising: an information terminal; a peripheral device; an account management server; and a peripheral device management server configured to store peripheral device management information associated with identification information of a peripheral device and register that peripheral device, wherein the information terminal transmits a request for a first token, which is to be issued by the peripheral device management server, according to an instruction of a user and receives the first token, which has been issued by the peripheral device management server and is associated with the identification information, the information terminal transmits an account registration request for the peripheral device, together with the first token, to the account management server, the account management server obtains the peripheral device management information of the peripheral device from the peripheral device management server using the first token, registers an account of the peripheral device, and transmits authentication information of that account to the information terminal, and the information terminal stores the received authentication information.

According to another aspect of the present invention, there is provided an information terminal comprising: at least one memory storing at least one program; and at least one processor, wherein the at least one program causes the at least one processor to: transmit a request for a first token, which is to be issued by a peripheral device management server, according to an instruction of a user; receive the first token, which has been issued by the peripheral device management server and is associated with identification information; transmit an account registration request for a peripheral device, together with the first token, to an account management server; receive, from the account management server, authentication information of an account of the peripheral device based on peripheral device management information of the peripheral device that the account management server obtained from the peripheral device management server using the first token; and store the received authentication information.

The present invention makes it possible to provide an authentication system that allows the use of network resources without undergoing special procedures.

Further features of the present invention will become apparent from the following description of exemplary embodiments with reference to the attached drawings.

BRIEF DESCRIPTION OF THE DRAWINGS

FIG. 5 illustrates a diagram of a sequence until the printing apparatus registers information in the peripheral device management server according to the first embodiment.

FIG. 6 is a diagram illustrating an example of information held in the peripheral device management server according to the first embodiment.

FIG. 8 illustrates a diagram of a sequence until the account management app registers an account according to the first embodiment.

FIG. 9 is a diagram illustrating an example of account information registered in an account management server according to the first embodiment.

FIG. 10 illustrates a flow of screens until a user uses the printing apparatus according to the first embodiment.

FIG. 11 illustrates a diagram of a sequence until the user uses the printing apparatus according to the first embodiment.

FIG. 13 illustrates a diagram of a sequence until the account management app registers an account according to the second embodiment.

DESCRIPTION OF THE EMBODIMENTS

Figure 1:
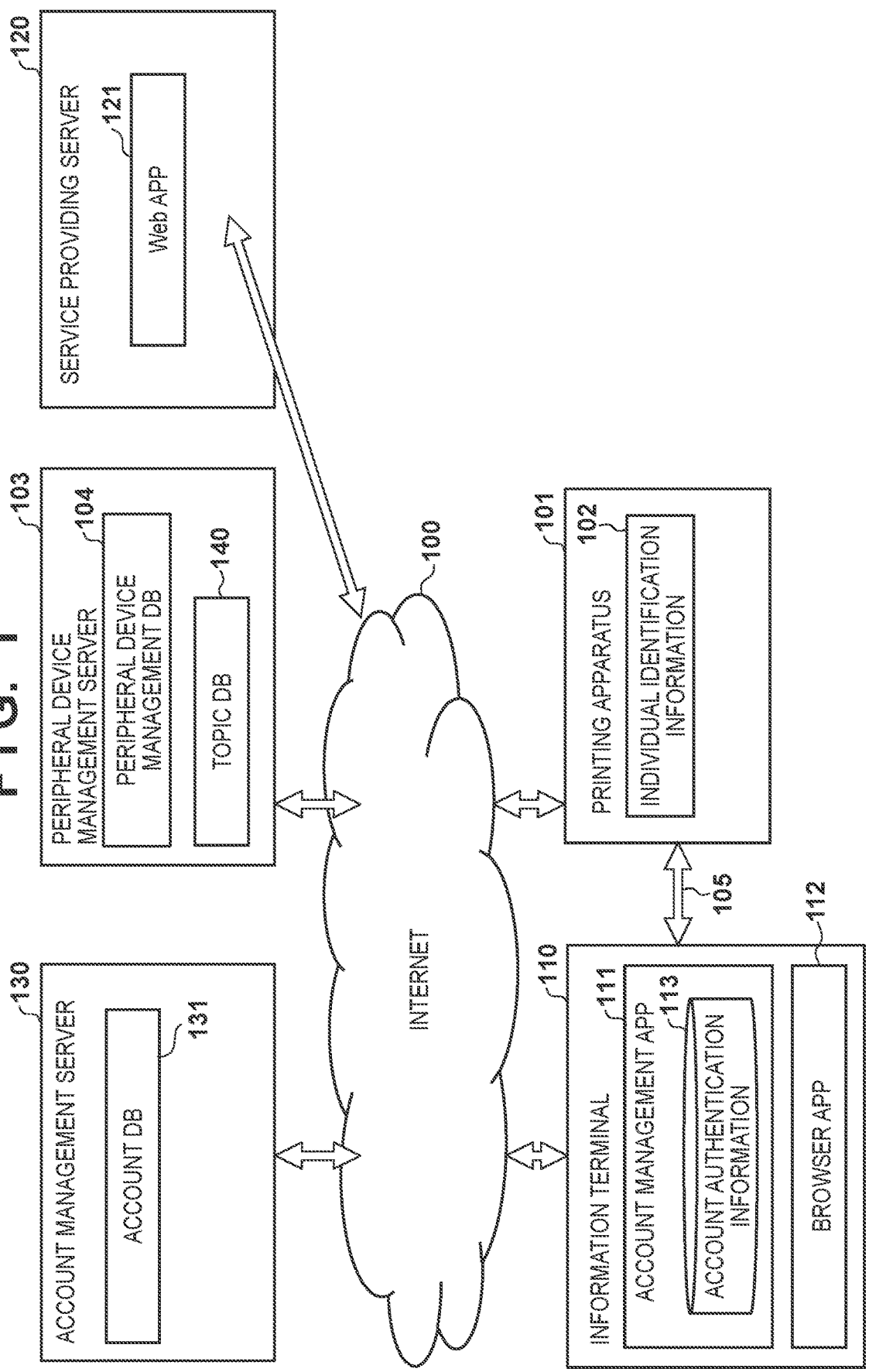
FIG. 1 is a diagram illustrating an overall system according to a first embodiment and a second embodiment.

Hereinafter, embodiments will be described in detail with reference to the attached drawings. Note, the following embodiments are not intended to limit the scope of the claimed invention. Multiple features are described in the embodiments, but limitation is not made to an invention that requires all such features, and multiple such features may be combined as appropriate. Furthermore, in the attached drawings, the same reference numerals are given to the same or similar configurations, and redundant description thereof is omitted.

First Embodiment

System Configuration

FIG. 1 is a diagram of an overall system configuration of a peripheral device utilization system according to a first embodiment and a second embodiment. The peripheral device utilization system may be referred to as an account management system, focusing on its account management function. A printing apparatus 101 holds individual identification information 102, such as a MAC address and a serial number. There need only be one individual identification information 102 per apparatus. The printing apparatus 101 is registered in a peripheral device management server 103 via the Web 100, and information can be exchanged therebetween via the Web 100. In the present embodiment, it is assumed that the Web 100 is used to connect devices; however, the network need only be the Internet and need not necessarily be a network that uses HTTP.

The peripheral device management server 103 registers and manages the printing apparatus 101 based on the individual identification information 102, and information for management (management information) thereof is stored in a peripheral device management database (DB) 104. The peripheral device management server 103 also has a function of delivering specific instructions for the printer, such as print instructions, to the printing apparatus 101 via the Web 100.

A local communication path 105 is a communication path that allows communication without going through the Web 100, such as a USB cable or a local network; the local communication path 105 allows direct communication between the printing apparatus 101 and an information terminal 110. Hereinafter, an application program will be abbreviated as "app".

The information terminal 110 is a user's smartphone or the like; a browser app 112 is installed thereon and the information terminal 110 can thereby load a Web app 121 from a service providing server 120 and execute the Web app 121. An account management app 111 is also installed on the information terminal 110. The account management app 111 has a function of communicating with an account management server 130 via the Web 100 and running the Web app 121 on the service providing server 120 by passing a URL of the Web app 121 to the browser app 112. The Web app 121 is an app called from a Web client (browser) provided in the information terminal 110 or the like and executed by the service providing server 120. The account management app 111 also holds account authentication information 113 for authenticating an account to the account management server 130. "App" is an abbreviation for application program.

The Web app 121, which is executed on the service providing server 120, is a service that provides a print function. The Web app 121 is actually an application that provides a screen related to printing, and actual printing is carried out by making a request to the peripheral device management server 103.

The account management server 130 has a function of accepting an account registration request from the account management app 111. The account management server 130 also has a function of communicating with the peripheral device management server 103 at the time of that registration process and a function of generating an account and authentication information thereof and transmitting the account and the authentication information thereof to the account management app 111. The account management server 130 also has a function of authenticating the account authentication information 113, which is held in the account management app 111, after registration has been completed.

In FIG. 1, the information terminal 110 and the printing apparatus 101 are connected to each other, and each is connected to the Internet; FIG. 1 illustrates a logical connection. For example, a configuration may be taken such that the information terminal 110 and the printing apparatus 101 are connected to one LAN and that LAN is connected to the Internet. Alternatively, a configuration may be taken such that the information terminal 110 and the printing apparatus 101 are each included in a different LAN, the different LANs being connected to each other, and one or both of the LANs is connected to the Internet.

Configuration of Information Terminal and Servers

Figure 2:
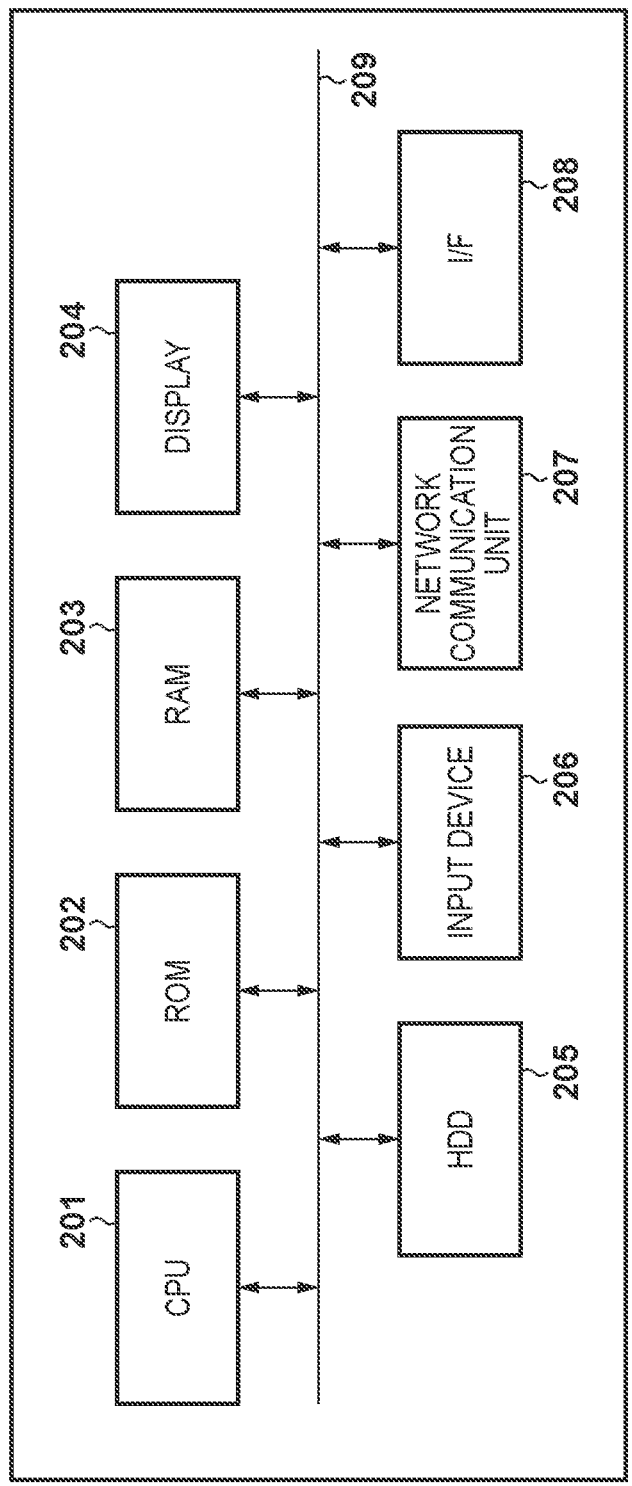
FIG. 2 is a diagram illustrating a block configuration of an information terminal and servers according to the first embodiment and the second embodiment.

FIG. 2 illustrates a hardware structure of the servers and the information terminal according to the first embodiment and the second embodiment. A CPU 201, a RAM 203, a ROM 202, a display 204, an input device 206, a network communication unit 207 and an I/F 208 are connected to an internal bus 209. The respective units connected to the internal bus 209 can exchange data with each other via the internal bus 209.

The RAM 203 is constituted by, for example, a volatile memory that uses a RAM semiconductor device. The CPU 201 is, for example, a processor (or processing unit) that executes a program stored in the ROM 202, and uses the RAM 203 as a working memory to control each unit of the server or the information terminal. The ROM 202 stores image data, audio data, and other data as well as various programs for operating the CPU 201 and the like. The ROM 202 may be, for example, a semiconductor device, but may be a hard disk (HD).

The display 204 displays, for example, images and graphical user interface (GUI) screens, which constitute GUIs, based on the control of the CPU 201. The CPU 201 generates a display control signal according to a program and controls each unit of the server or the information terminal so as to generate a video signal for display on the display 204 and output the video signal to the display 204. The display 204 displays an image based on the outputted video signal. The configuration of the servers and the information terminal themselves may include up to an interface for outputting the video signal for display on the display 204, and the display 204 may be configured by an external monitor TV or the like.

The input device 206 is an input device that is for receiving user operations and includes, for example, a text information input device, such as a keyboard, as well as a touch pad, a touch sensor, a joystick, a dial, a button, and a pointing device, such as a mouse or a touch panel. The touch panel is an input device that is configured to be flatly laid over the display 204 so that coordinate information that corresponds to the touched position is outputted. The network communication unit 207 is an input/output device that is for performing network communication and connected to a LAN or the Web.

Configuration of Printing Apparatus

Figure 3:
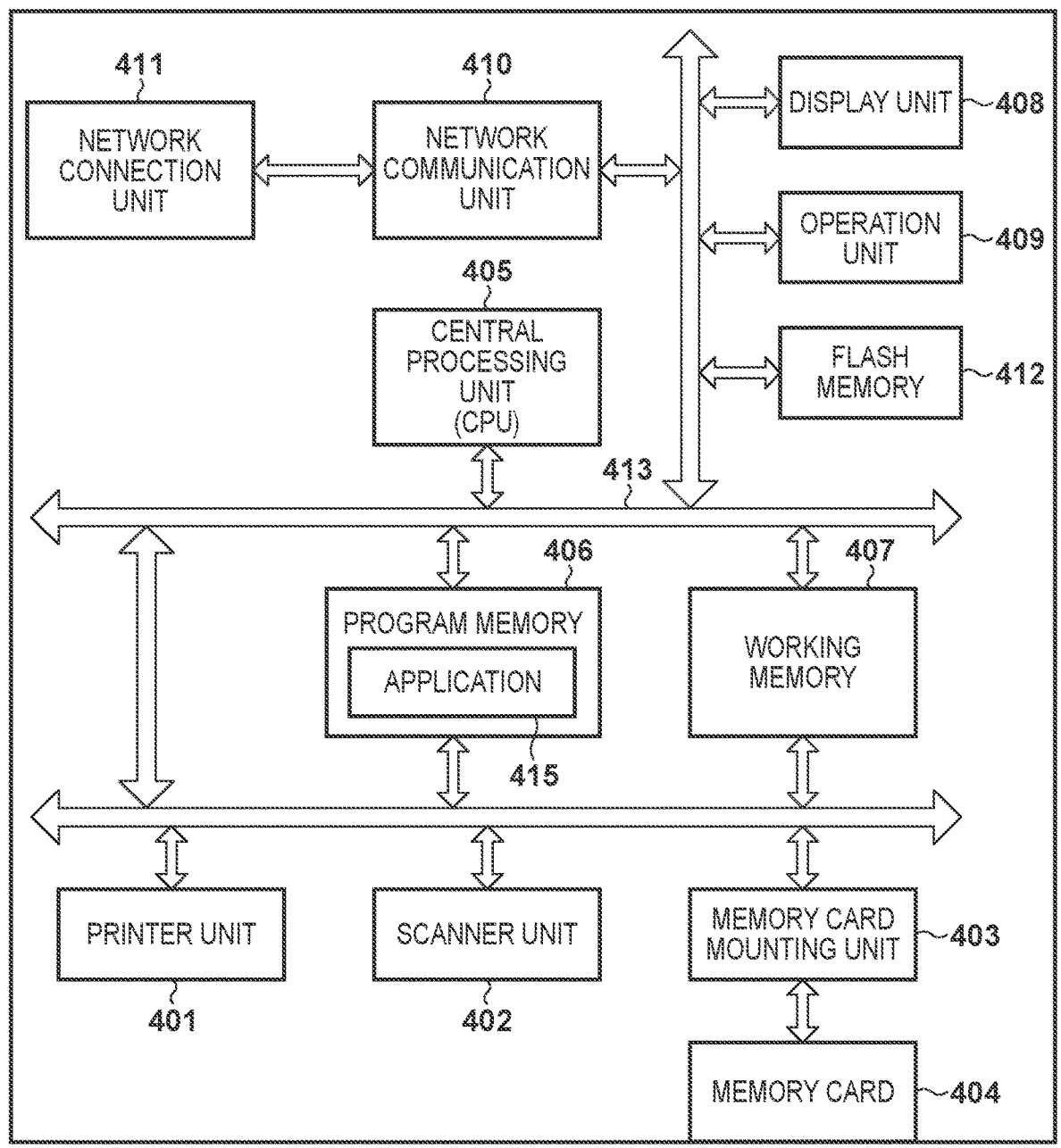
FIG. 3 is a diagram illustrating a block configuration of a printing apparatus according to the first embodiment and the second embodiment.

FIG. 3 is a block diagram illustrating a schematic configuration of the printing apparatus 101 according to the first embodiment and the second embodiment. In the printing apparatus 101, a printing function is realized in a printer unit 401, a scanner function is realized in a scanner unit 402, and a storage function is realized in a memory card mounting unit 403 and a memory card 404.

The printer unit 401 prints, for example, image data received from the outside and image data stored in the memory card 404, onto printing paper using a printing method, such as an inkjet method or an electrophotographic method. The printer unit 401 also manages ink information, which includes the remaining amount of ink, and paper information, which includes the number of stacked sheets.

The scanner unit 402 optically reads a document set on a document table (not illustrated), converts the document into electronic data, and further transmits image data converted into a specified file format to an external device via a network or stores the image data in a storage region (not illustrated), such as an HDD. In addition, a copy service is realized by transferring image data produced by reading a document placed on the document table using the scanner unit 402 to the printer unit 401 and the printer unit 401 printing that image data onto printing paper.

Various kinds of file data is stored in the memory card 404, which is mounted on the memory card mounting unit 403. The file data may also be read and edited from an external device via a network. The file data can also be stored in the memory card 404 from an external device.

The printing apparatus 101 further includes a CPU 405, a program memory 406, a working memory 407, a display unit 408, an operation unit 409, a network communication unit 410, a network connection unit 411, and a flash memory 412. The CPU 405 is a central processing unit for controlling each unit of the printing apparatus 101. The program memory 406 is constituted by a ROM or the like and stores various kinds of program code and an application 415 for communicating with a server apparatus. The application 415 accesses the printer unit 401 and thereby obtains information on consumables, such as ink and paper. The working memory 407 is constituted by a RAM or the like and temporarily stores or buffers image data or the like when a respective service is executed.

The display unit 408 is constituted by, for example, an LCD and displays various kinds of information. The operation unit 409 includes a switch and the like for the user to perform various kinds of input operation. The network communication unit 410 performs various kinds of communication by connecting the printing apparatus 101 to a network. Connection with a network, such as the Internet, can be established via the network connection unit 411. The network communication unit 410 supports a wired LAN and a wireless LAN. The network connection unit 411 is a connector for connecting a wired LAN cable in a case where the wired LAN is supported, and the network connection unit 411 is an antenna in a case where the wireless LAN is supported. The network connection unit 411 may support both the wired LAN and the wireless LAN. The flash memory 412 is a non-volatile memory for storing, for example, image data received by the network communication unit 410. In addition, the respective, above-described units are connected to each other by a bus 413. Further, a process of the printing apparatus 101 to be described later is realized by the CPU 405 reading out a program necessary for the process and executing the program.

Registering Peripheral Device to Peripheral Device Management Server

Figure 4A:
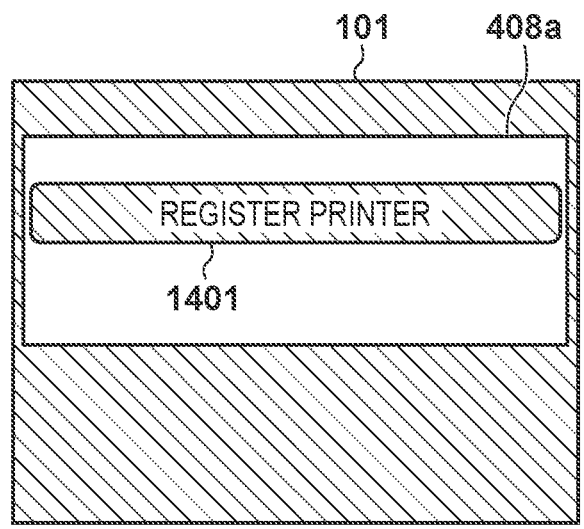
FIGS. 4A and 4B illustrate UIs for registering the printing apparatus in a peripheral device management server according to the first embodiment.
Figure 4B:
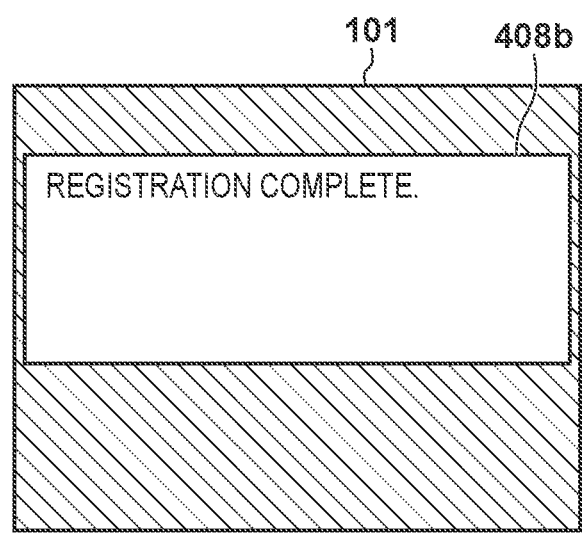

FIGS. 4A and 4B illustrate an example of screens for when the main body of the printing apparatus 101, which is to be used by the user and is one example of an apparatus to which the present invention can be applied, is registered in the peripheral device management server 103. When the user performs a registration operation, a screen 408a, which includes a button 1401, is displayed on the display unit 408 mounted on the printing apparatus 101. When the button 1401 for registering the printing apparatus 101 to the peripheral device management server 103 is pressed, a registration process occurs, and when registration has been completed, a screen 408b is displayed to inform the user that registration has been completed. The screen 408a is displayed by a program installed on the printing apparatus 101. The screen 408a may be generated by the program, or a Web browser may be used as a program and a screen obtained by the Web browser from a Web server that is executed on the peripheral device management server 103 may be displayed.

FIG. 5 illustrates a diagram of a sequence until the printing apparatus 101 registers information in the peripheral device management server 103 according to the present embodiment. When a user 000 presses the "register printer to Web" button 1401 on the screen 408a, the printing apparatus 101 transmits its individual identification information 102 and makes a request for the printing apparatus 101 itself to be registered to the peripheral device management server 103 (502). Then, the peripheral device management server 103 performs a process 503 for issuing peripheral device management information, which is for managing the printing apparatus 101, in a format in which the peripheral device management information is associated with the individual identification information 102 and registers the peripheral device management information and the individual identification information 102 in the peripheral device management DB (504). Then, the peripheral device management server 103 transmits a registration complete response to the effect that registration has been completed, to the printing apparatus 101 (505), and the printing apparatus 101 displays a registration complete screen 408b (506).

There are various kinds of techniques for registering the printing apparatus 101 to the peripheral device management server 103. For example, in the present embodiment, the printing apparatus 101 is registered by transmitting the individual identification information 102, such as a MAC address initially held on the printing apparatus 101 side, to the peripheral device management server 103. Conversely, the printing apparatus 101 side need not initially hold the individual identification information 102 and thus need not transmit any such information at the time of the registration request. In such a case, a configuration may be taken such that when performing the individual management information issuance process 503, the peripheral device management server 103 simultaneously generates the individual identification information 102 and transmits the individual identification information 102 to the printing apparatus 101 such that the printing apparatus 101 holds the individual identification information 102.

As described above, when registering the printing apparatus 101, the individual identification information 102 and the individual management information may be issued at any device.

Further, instead of exchanging the individual identification information 102, communication identification information (ID) for communicating with each other may be exchanged. For example, in a technique referred to as MQTT, two devices do not remember each other's individual identification number but share a topic name that defines a location at which information is exchanged, thereby allowing communication between those that share the same topic name. Such a topic name may be transmitted to the printing apparatus 101 upon completion of registration.

FIG. 6 illustrates an example of the individual identification information 102 and peripheral device management information 601 registered in the peripheral device management DB 104 in the sequence illustrated in FIG. 5 according to the present embodiment. A unique ID, which is for managing the peripheral device and which is issued by the individual management information issuance process 503, is stored in the peripheral device management information 601. A MAC address and a serial number transmitted from the printing apparatus 101 are registered in the individual identification information 102. Alternatively, it may be either one of the MAC address and the serial number. In addition, information on a product name and held functions is stored, from the MAC address, the serial number, and the like, as peripheral device basic information 602, which indicates characteristics of the individual.

In the present embodiment, the information on the product name and held functions are stored as the peripheral device basic information 602; however, it need not be stored. The peripheral device basic information 602 is information to be used for performing display on a user interface in the present embodiment and thus may be obtained, for example, whenever necessary, from the individual identification information 102. In addition, various kinds of information to be used for subsequent communication, such as the aforementioned topic name of MQTT, may be stored together.

Figure 7A:
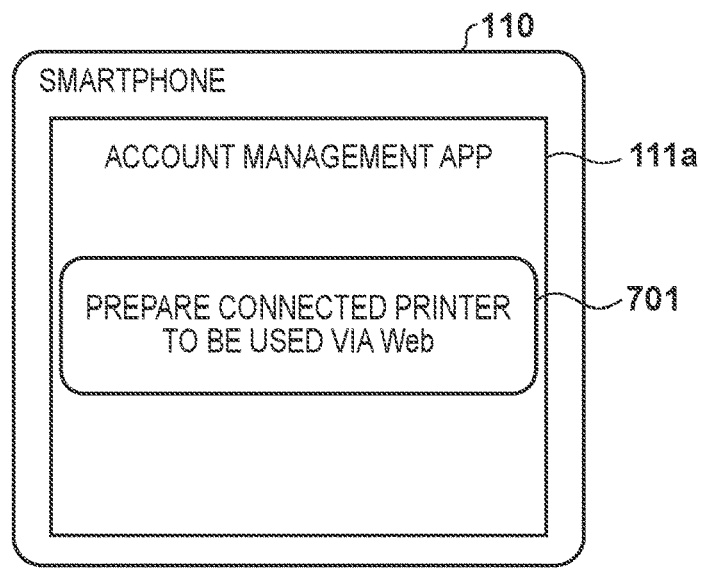
FIGS. 7A, 7B, and 7C illustrate a flow of screens until an account management app registers an account according to the first embodiment.
Figure 7B:
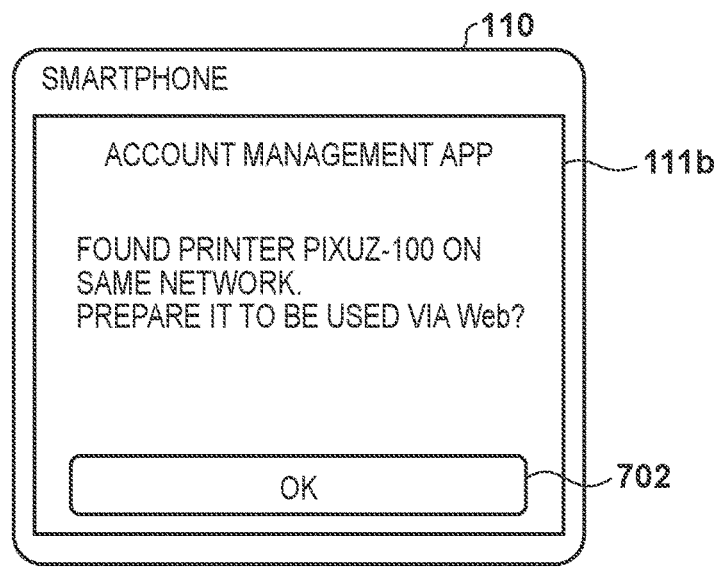
Figure 7C:
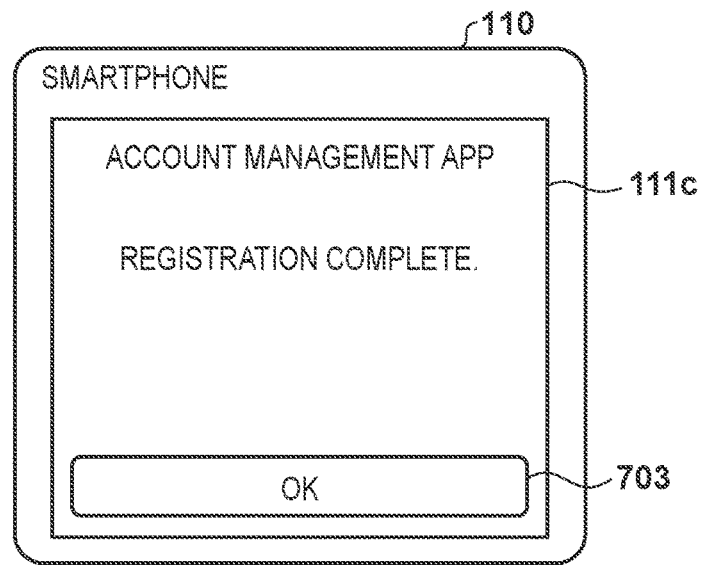

Registering Account of Information Terminal in Account Management Server FIGS. 7A to 7C illustrate a flow of screens until the account management app 111 on the information terminal 110 registers information in the peripheral device management server 103 according to the present embodiment. A screen 111a is a screen for registering an account associated with a peripheral device in the account management app 111. For example, the screen 111a (FIG. 7A) is displayed by selecting to register an account on a screen of the account management app 111. When the user presses a button 701 in the screen 111a, the account management app 111 searches for a peripheral device on the same LAN and displays a screen 111b (FIG. 7B), which indicates a result of the search. The screen 111b may display the name of a found peripheral device, which in this example is the printing apparatus 101. If a peripheral device is not found, it may be displayed that a peripheral device could not be found. Information to be registered is information related to a peripheral device that is the target, such as individual identification information and peripheral device management information, and the peripheral device that is the target may be referred to as a target peripheral device.

When the user presses a button 702 for executing account registration on the screen 111b, a registration process by the account management app 111 is executed. The target of registration is a peripheral device displayed on the screen 111b; if there are a plurality of peripheral devices, the target of registration may be all or those selected therefrom. When the registration process has been completed, a screen 111c (FIG. 7C), which indicates completion of the registration process, is displayed. When an OK button 703 is pressed on the screen 111c, the account registration process is ended. A press of a button on a screen is executed by an operation, such as touching a button object or selecting and clicking a button object.

FIGS. 7A to 7C illustrate an example in which only one printing apparatus 101 is found on the same LAN; however, a plurality of apparatuses may be found, and in such a case, a configuration may be taken so as to issue options as to which of the apparatuses to register or to register all of the apparatuses and perform registration according to the selection. In addition, not only printing apparatuses 101 on the same LAN but also printing apparatuses 101 that are physically connected to a smartphone over a USB cable or the like may be a search target. Alternatively, printing apparatuses 101 that are at a distance at which connection can be established by, for example, a non-contact, short-range wireless technique, such as Bluetooth or near-field communication (NFC), may be searched for.

FIG. 8 is a diagram of a sequence until the account management app 111 on the information terminal 110, such as a smartphone, registers an account in the peripheral device management server 103 and obtains the account authentication information 113 according to the present embodiment. A hardware entity that executes the account management app 111 is the CPU 201 of the information terminal 110. A processing entity is the CPU 201 in the peripheral device management server 103 and the account management server 130 as well. A processing entity is the CPU 405 in the printing apparatus 101.

In response to the user 000 pressing the button 701 on the screen 111a in FIG. 7A (801), the account management app 111 searches for a peripheral device on the same LAN (802). As one example, when the printing apparatus 101 is found (803), the account management app 111 displays the screen 111b (FIG. 7B) for confirming whether the found printing apparatus 101 is to be a registration target (804). When the user 000 presses the button 702 on the screen 111b (805), the account management app 111 makes a request to the selected peripheral device, which in this case is the printing apparatus 101, for the individual identification information 102, such as a MAC address (806). Then, as a response to that, the account management app 111 obtains the individual identification information 102 (807).

The account management app 111 requests the peripheral device management server 103 for a first token using the individual identification information 102 as an argument (or parameter) (808). Upon confirming the peripheral device management information 601 based on the individual identification information 102 (809), the peripheral device management server 103 issues a first token that is associated with the peripheral device management information 601 and transmits the first token to the account management app 111 (810). The account management app 111 makes a request for app account registration to the account management server 130 using the received first token as an argument (811). The account management server 130 transmits a request to the peripheral device management server 103 to confirm the received first token (812). Upon confirming the first token, the peripheral device management server 103 will transmit the peripheral device management information 601 that is associated with that first token to the account management server 130 (813).

The first token having been confirmed means that the peripheral device management information that is associated with the first token is registered in the peripheral device management DB 104. Therefore, the confirmation here can also be referred to as authentication. The first token and the peripheral device management information may be associated by, for example, including encrypted peripheral device management information in the first token. The confirmation may be performed by decrypting the first token and comparing the first token against a record of the peripheral device management information registered in the peripheral device management DB 104.

Upon receiving the peripheral device management information, the account management server 130 issues and stores the account authentication information 113 (see FIG. 9) and generates an account that is associated with the received peripheral device management information (814). Then, the account management server 130 transmits the issued account authentication information 113 (also simply referred to as authentication information) to the account management app 111 (815).

The account management app stores the transmitted account authentication information 113 (816) and displays the screen 111c (FIG. 7C) (817). The authentication information includes, for example, an ID and a password. The user may be allowed to change the password.

FIG. 9 illustrates information on accounts registered in an account DB 131 of the account management server 130. An account ID 901 for identifying the account, the account authentication information 113 for authenticating the account, and owned peripheral device management information 904 of a peripheral device owned by the account holder are associated and stored. An authentication ID 902 and a password 903, for example, are stored in the account authentication information 113. Further, the peripheral device management information 601 obtained from the peripheral device management server 103 in step 813 is stored in the owned peripheral device management information 601.

Here, in the present embodiment, the account authentication information 113 is a combination of an ID and a password but, needless to say, the account authentication information 113 may be other information, such as a secret key, so long as the information is for authenticating an account.

With the above, the account management app 111 can obtain the account authentication information 113 for accessing the account for certifying ownership of a peripheral device.

FIG. 10 illustrates an example of a screen flow illustrating a flow until the user uses the printing apparatus 101 in the present embodiment. For example, a screen 111d is displayed by selecting to use a peripheral device on a screen of the account management app 111. In the following example, the printing apparatus 101 will be described as an example of a peripheral device; however, it is similar for other peripheral devices. The user 000 presses a button 1001 for using the printing apparatus 101 on the screen 111d of the account management app 111 on the information terminal 110. In response to that, the account management app 111 generates a URL of the Web app 121 in which a second token is an argument. It is assumed that the second token has already been generated. In addition, the Web app 121 is executed on the service providing server 120 and is used from the information terminal 111 via a Web browser (browser app). When the URL of the Web app 121 is passed to the running browser app 112, that URL is displayed in an address bar 1002a of the browser and the browser app 112 accesses that URL. Upon accessing that URL, the browser app 112 communicates with the Web app 121, which is specified by that URL. Upon confirming that the passed second token is correct, the Web app 121 transmits a URL for displaying a post-authentication screen to the browser app 112. The browser app 112 displays that URL in an address bar 1002b and accesses that URL. The Web app 121 transmits a screen 1004, which corresponds to that URL, to the browser app 112, and the browser app 112 displays the screen 1004.

The user 000 can operate the printing apparatus 101 by pressing a button 1005 on the screen 1004. In that operation, the user can, for example, specify document data to be printed as well as instruct printing after specifying parameters.

FIG. 11 is a sequence diagram illustrating a flow until the user uses the printing apparatus 101 in the present embodiment. A hardware entity that executes the account management app 111 is the CPU 201 of the information terminal 110. A processing entity is the CPU 201 in the peripheral device management server 103, the account management server 130, and the service providing server 120 as well. A processing entity is the CPU 405 in the printing apparatus 101.

The user presses the button 1001 for using the printing apparatus 101 in the account management app 111 (1101). In response to that, the account management app 111 requests the account management server 130 to issue a second token, using the account authentication information 113 as an argument (1102). Upon confirming the authentication information (authenticating the request) (1103), the account management server 130 issues a second token that is associated with the account information (1104) and transmits the second token to the account management app 111 (1105). In the confirmation of authentication information, that authentication information will be confirmed if corresponding authentication information is registered in the account DB 131. The account management app 111 generates a URL for accessing the service providing server 120 using the received second token as an argument (1106) and passes the generated URL to the browser app 112 (1107). If the browser app 112 is not running, the account management app 111 starts up the browser app 112 and then passes the generated URL. The browser app 112 accesses the service providing server 120 based on the passed URL (1108). This access is for requesting a service, such as printing, from the service providing server 120.

The accessed service providing server 120 obtains the second token from the argument of the URL (1109) and, together with the second token, transmits, to the account management server 130, a request for obtaining the peripheral device management information that is associated with the second token (1110). The account management server 130 identifies an account ID that is associated with the second token (1111) and obtains the peripheral device management information 601 from the owned peripheral device information 904 of the account information that is associated with that account ID. Here, the identification of an account ID that is associated with the second token can also be referred to as authentication of a request by the service providing server 120 using the second token. The account management server 130 transmits the obtained peripheral device management information 601 to the service providing server 120 (1112).

The service providing server 120 makes a request for obtaining the peripheral device basic information 602 to the peripheral device management server 103 based on the received peripheral device management information 601 (1113). The peripheral device management server 103 transmits the peripheral device basic information 602 that is associated with the peripheral device management information 601 to the service providing server 120 (1114). Here, if authentication by the peripheral device management server 103 is necessary for access by the service providing server 120, the account management app 111 passes the first token, together with the second token, to the service providing server 120. Then, in step 1113, the service providing server 120 need only pass the first token, together with the request, to the peripheral device management server 103.

The service providing server 120 generates the screen 1004 based on the peripheral device basic information 602 (1115) and generates an authentication session identifier (session token) that is associated with the peripheral device management information 601 (1116). A session token is an identifier that is given to identify, for example, a series of interactions (sessions) between an HTTP client and a server, and in this example, a session token can identify a session for authentication. The service providing server 120 includes the session token of an authentication session in a cookie and transmits the generated screen 1004, together with the cookie, to the browser app 112 (1117). The browser app 112 displays the received screen 1004.

When the user presses the operation start button 1005 of the screen 1004 displayed on the browser app 112 (1118), an operation command is transmitted to the service providing server 120, together with the cookie to which the session token of the authentication session is attached (1119). Upon receiving the operation command, the service providing server 120 obtains the peripheral device management information 601 that is associated with the session token from the session token of the authentication session (1120). Then, the service providing server 120 can transmit the operation command for the printing apparatus 101, which is the subject of the peripheral device management information, to the peripheral device management server 103 (1121).

In response to this operation command, the peripheral device management server 103 operates the printing apparatus 101. For example, in a case of printing a specified document, a print job and data to be printed are passed to and stored in the peripheral device management server 103. The printing apparatus 101 queries the peripheral device management server 103 for a print job addressed to the printing apparatus 101 and, if any, downloads and executes the print job. Alternatively, the peripheral device management server 103 may transmit a print job and data to be printed to the printing apparatus 101 and the printing apparatus 101 may execute the job. Of course, the operation to be executed is not limited to printing and need only be an operation that is supported by the peripheral device.

As described above, in the present embodiment, a user who, from the beginning, can freely use the printing apparatus 101, such as when the user is on the same LAN or the like, can make the account management app 111 remember an account on which the printing apparatus 101 can be operated via the Internet, simply by pressing a button. This makes it possible to operate the printing apparatus 101 via the Internet rather than over the LAN, without cumbersome operations, such as registration and login.

In the present embodiment, the printing apparatus 101 is registered;

however, it is needless to say that not only the printing apparatus 101 but also various kinds of peripheral devices, such as a camera and a scanner, may be registered and managed in the peripheral device management server 103.

Second Embodiment

In the first embodiment, the account management app 111 obtains the individual identification information from the printing apparatus 101 to be registered and directly obtains the first token from the peripheral device management server 103 using the individual identification information. In contrast to this, in the present embodiment, the account management app 111 obtains the first token from the peripheral device management server 103 via the printing apparatus 101 to be registered. At that time, the peripheral device to be registered interacts with the peripheral device management server 103, and thus, at that opportunity, the peripheral device to be registered can be registered to the peripheral device management server 103. Therefore, the sequence of registration illustrated in FIG. 5 is unnecessary in the present embodiment. However, the sequence of registration illustrated in FIG. 5 may be performed. Further, in the present embodiment, the information terminal 110 and the printing apparatus 101 are different from the first embodiment in that they are connected over USB.

Figure 12A:
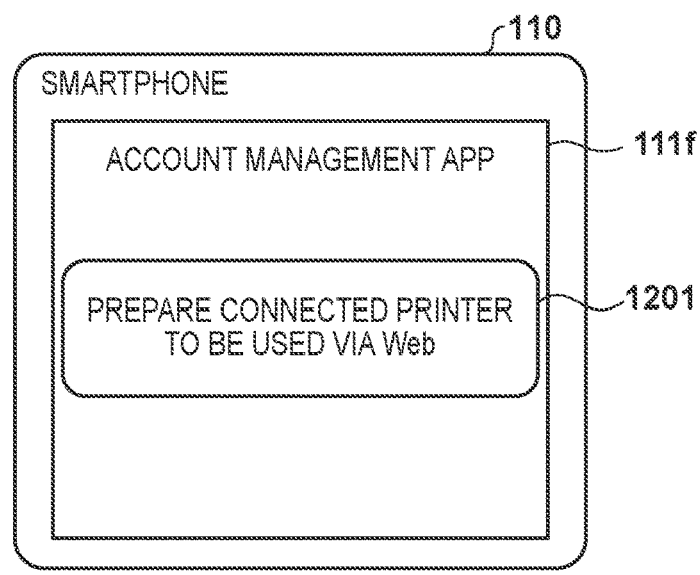
FIGS. 12A, 12B, and 12C illustrate a flow of screens until the account management app registers an account according to the second embodiment.
Figure 12B:
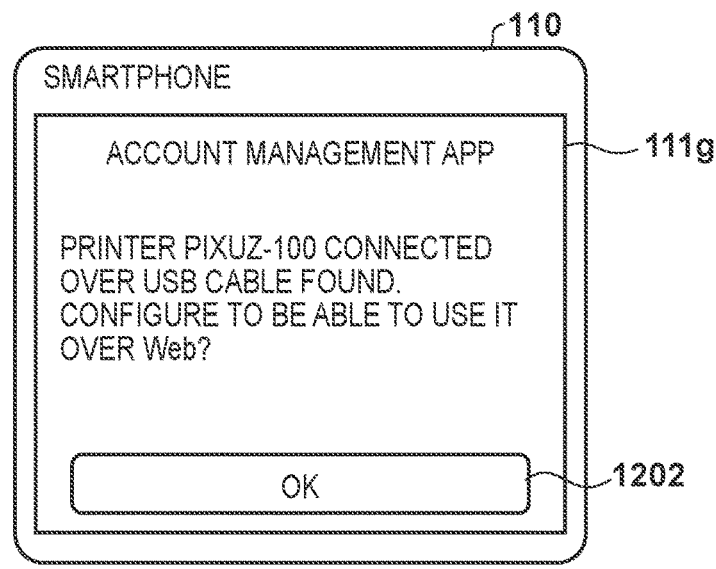
Figure 12C:
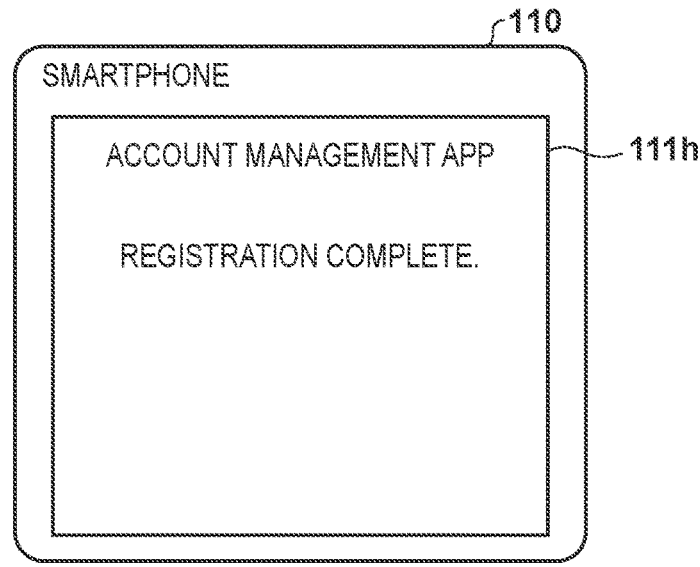

FIGS. 12A to 12C are a flow of screens until the information terminal 110 registers an account and obtains the account authentication information 113 according to the second embodiment. A screen 111*f* (FIG. 12A) is a screen of the account management app 111, which is running on the information terminal 110, and when a button 1201 for starting account registration is pressed, a printer connected over USB is searched for and a screen 111*g* (FIG. 12B) is displayed. When the user presses a button 1202, an account is registered and a screen 111*h* (FIG. 12C) is displayed.

FIG. 13 is a diagram of a sequence until the information terminal 110 registers an account and obtains the account authentication information 113 according to the second embodiment. FIG. 13 is a procedure to be executed in the present embodiment in place of FIG. 8 of the first embodiment. In the present embodiment, the configurations of the databases of FIGS. 6 and 9, the user interfaces illustrated in FIG. 10, and the procedure illustrated in FIG. 11 until the information terminal 110 receives the service provided by the service providing server 120 are similar to those of the first embodiment. The configurations of the respective apparatuses and servers are also similar to those of the first embodiment.

When the user 000 presses the button 1201 on the screen 111*f* (FIG. 12A) (1301), the account management app 111 searches for a printer connected over USB (1302), finds a printer (1303), and displays the screen 111*g* (FIG. 12B) (1304). When the user presses the button 1202 on the screen 111*g* (1305), a first token obtaining request is made to the printing apparatus 101 through a USB cable (1306).

Upon receiving the first token obtaining request, the printing apparatus 101 determines whether the printing apparatus 101 itself is registered in the peripheral device management server 103. If unregistered (1307), the printing apparatus 101 makes a registration request to the peripheral device management server 103 using the individual identification information 102 held in the printing apparatus 101 itself as an argument (1308). The individual identification information 102 may be any information unique to the individual. For example, the peripheral device management server 103 may assign individual identification information to a request source apparatus in response to a registration request.

Upon request, the peripheral device management server 103 issues the peripheral device management information 601 (1309), registers the peripheral device management information 601 in the peripheral device management DB 104 (1310), and transmits that registration has been completed to the printing apparatus 101 (1311). The determination as to whether the printing apparatus 101 is registered in the peripheral device management server 103 may be made by storing that at the time of registration and referencing that which is stored. Alternatively, the printing apparatus 101 may, without making that determination, unconditionally transmit a registration request to the peripheral device management server 103. In the latter case, the peripheral device management server 103 need only determine whether the request source peripheral device is registered; if the device is not registered, the peripheral device management server 103 registers the peripheral device and, if the device is registered, the peripheral device management server 103 responds that the peripheral device is already registered. In addition, in the case of assigning the individual identification information, the peripheral device management server 103 need only return the assigned individual identification information to the request source peripheral device and the peripheral device need only store the assigned individual identification information.

Upon receiving that registration in the peripheral device management server 103 has been completed or when the printing apparatus 101 is already registered, the printing apparatus 101 requests the peripheral device management server 103 to issue a first token using the individual identification information 102 held by the printing apparatus 101 itself as an argument (1312). The peripheral device management server 103 obtains the peripheral device management information 601 that corresponds to the individual identification information 102 from the peripheral device management DB 104 (1313). In addition, the peripheral device management server 103 issues a first token in a format in which it is associated with the peripheral device management information 601 and transmits the first token to the request source peripheral device, which here is the printing apparatus 101 (1314).

Upon receiving the first token, the printing apparatus 101 transmits the first token to the account management app 111 (1315). This makes it possible for the account management app 111 to obtain the first token for which it made a request to the printing apparatus 101.

The account management app 111 makes a request for app account registration to the account management server 130 using the received first token as an argument (1316).

The account management server 130 makes a request for confirmation of the first token to the peripheral device management server 103 (1317) and receives the peripheral device management information 601 from the peripheral device management server 103 as a confirmation result (1318). This confirmation request can be reworded as an authentication request. The account management server 130 automatically generates the account authentication information 113 and stores the account authentication information 113, together with peripheral device management information 601, and thereby issues an account (1319). Then, the account management server 130 transmits the issued account authentication information 113 to the account management app 111 (1320).

The account management app 111 stores the received account authentication information 113 (1321) and displays the screen 111*h* (FIG. 12C) (1322). With the above, the creation of an account and the issuance of authentication information by the account management server 130 are completed. Thereafter, the registered peripheral device can be used from the information terminal 110 according to the procedure of FIG. 11.

In the present embodiment, a printer connected over a USB cable is searched for; however, a printer on the same LAN may be searched for, and the request for a first token may also be made via a network cable.

As described above, in the present embodiment, even if the printing apparatus 101 is not yet registered in the peripheral device management server 103, it is possible to make the account management app 111 remember an account on which the printing apparatus 101 can be operated via the Internet, simply by pressing a button.

Thus, in the first and second embodiments, the user can enable a peripheral device to be used via the Internet by calling the account management app and pressing a registration button, without having to input complicated information. Furthermore, the user can use the peripheral device that has become usable, without having to input complicated information.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2022-207241, filed Dec. 23, 2022 which is hereby incorporated by reference herein in its entirety.

What is claimed is:

1. An account management system comprising:
an information terminal;
a peripheral device;
an account management server;
a peripheral device management server configured to store peripheral device management information associated with identification information of the peripheral device and register the peripheral device; and
a service providing server configured to provide a service responsive to a request,
wherein the information terminal:
transmits a request for a first token, which is to be issued by the peripheral device management server, according to an instruction of a user;
receives the first token, which has been issued by the peripheral device management server and is associated with the identification information; and
transmits an account registration request for the peripheral device, together with the first token, to the account management server,
wherein the account management server:
obtains the peripheral device management information of the peripheral device from the peripheral device management server using the first token;
registers an account of the peripheral device; and
transmits authentication information of the account to the information terminal,
wherein the information terminal:
stores the received authentication information;
transmits a request for a second token, together with the authentication information of the account, to the account management server before requesting the service providing server for a service;
obtains the second token, which has been authenticated and issued by the account management server and is associated with the account; and
requests the service providing server for the service, together with the second token, and
wherein the service providing server:
accesses the account management server using the second token; and
obtains the peripheral device management information of the peripheral device of the account associated with the second token.

2. The account management system according to claim 1, wherein:
the information terminal transmits the request for the first token to the peripheral device according to the instruction, and
in a case where the peripheral device is not registered in the peripheral device management server, the peripheral device:
transmits a registration request, together with the identification information of the peripheral device, to the peripheral device management server;
registers the peripheral device in the peripheral device management server;
obtains the first token associated with the identification information from the peripheral device management server; and
transmits the first token to the information terminal.

3. The account management system according to claim 1, wherein:
the information terminal transmits the request for the first token to the peripheral device according to the instruction,
in a case where a peripheral device of the identification information is not registered in the peripheral device management server, the peripheral device management server registers the peripheral device, and
the peripheral device obtains the first token associated with the identification information from the peripheral device management server and transmits the first token to the information terminal.

4. The account management system according to claim 1, wherein the information terminal:
obtains the identification information from the peripheral device according to the instruction;
transmits the request for the first token, together with the identification information, to the peripheral device management server; and
receives the first token associated with the identification information from the peripheral device management server.

5. The account management system according to claim 1, wherein the peripheral device management server authenticates access according to the first token.

6. The account management system according to claim 5, wherein the peripheral device management server:
includes a database of peripheral device management information including the identification information of the peripheral device and basic information of the peripheral device; and
authenticates access according to the first token associated with identification information based on the database.

7. The account management system according to claim 1, wherein the service providing server:
obtains the peripheral device management information of the peripheral device from the account management server;
obtains the identification information associated with the peripheral device management information from the peripheral device management server; and
provides a screen for providing a service that uses a peripheral device of the identification information to the information terminal.

8. The account management system according to claim 1, wherein the peripheral device is a printing apparatus.

9. An account management method in an account management system comprising:
an information terminal;

a peripheral device;
an account management server;
a peripheral device management server configured to store peripheral device management information associated with identification information of the peripheral device and register the peripheral device; and
a service providing server configured to provide a service responsive to a request, the method comprising:
causing the information terminal to:
  transmit a request for a first token, which is to be issued by the peripheral device management server, according to an instruction of a user;
  receive the first token, which has been issued by the peripheral device management server and is associated with the identification information; and
  transmit an account registration request for the peripheral device, together with the first token, to the account management server;
causing the account management server to:
  obtain the peripheral device management information of the peripheral device from the peripheral device management server using the first token;
  register an account of the peripheral device; and
  transmit authentication information of the account to the information terminal, and
causing the information terminal to:
  store the received authentication information;
  transmit a request for a second token, together with the authentication information of the account, to the account management server before requesting the service providing server for a service;
  obtain the second token, which has been authenticated and issued by the account management server and is associated with the account; and
  request the service providing server for the service, together with the second token, and
causing the service providing server to:
  access the account management server using the second token; and
  obtain the peripheral device management information of a peripheral device of the account associated with the second token.

10. An information terminal comprising:
at least one memory storing at least one program; and
at least one processor that executes the at least one program to:
  transmit a request for a first token, which is to be issued by a peripheral device management server, according to an instruction of a user;
  receive the first token, which has been issued by the peripheral device management server and is associated with identification information;
  transmit an account registration request for a peripheral device, together with the first token, to an account management server;
  receive, from the account management server, authentication information of an account of the peripheral device based on peripheral device management information of the peripheral device that the account management server obtained from the peripheral device management server using the first token;
  store the received authentication information;
  transmit a request for a second token, together with the authentication information of the account, to the account management server before requesting a service providing server for a service;
  obtain the second token, which has been authenticated and issued by the account management server and is associated with the account; and
  request the service providing server for the service, together with the second token, wherein the service providing server:
    accesses the account management server using the second token; and
    obtains the peripheral device management information of a peripheral device of the account associated with the second token.

11. The information terminal according to claim 10, wherein:
the at least one processor executes the at least one program to obtain the identification information from the peripheral device according to the instruction,
the request for the first token is transmitted, together with the identification information, to the peripheral device management server, and
the received first token is associated with the identification information from the peripheral device management server.

12. A non-transitory computer-readable storage medium storing at least one program executable by a computer to execute a method comprising:
  transmitting a request for a first token, which is to be issued by a peripheral device management server, according to an instruction of a user;
  receiving the first token, which has been issued by the peripheral device management server and is associated with identification information;
  transmitting an account registration request for the peripheral device, together with the first token, to an account management server;
  receiving, from the account management server, authentication information of an account of the peripheral device based on peripheral device management information of the peripheral device that the account management server obtained from the peripheral device management server using the first token;
  storing the received authentication information;
  transmitting a request for a second token, together with the authentication information of the account, to the account management server before requesting a service providing server for a service;
  obtaining the second token, which has been authenticated and issued by the account management server and is associated with the account; and
  requesting the service providing server for the service, together with the second token, wherein the service providing server:
    accesses the account management server using the second token; and
    obtains the peripheral device management information of a peripheral device of the account associated with the second token.

* * * * *